United States Patent [19]

Mark

[11] Patent Number: 4,506,046
[45] Date of Patent: Mar. 19, 1985

[54] FLAME RETARDANT POLYCARBONATE COMPOSITIONS

[75] Inventor: Victor Mark, Evansville, Ind.

[73] Assignee: General Electric Company, Mt. Vernon, Ind.

[21] Appl. No.: 596,656

[22] Filed: Apr. 4, 1984

Related U.S. Application Data

[62] Division of Ser. No. 498,945, May 27, 1983, Pat. No. 4,469,833.

[51] Int. Cl.$^3$ ............................................... C08K 5/42
[52] U.S. Cl. .................................... 524/83; 524/161; 524/162; 524/166
[58] Field of Search ................ 524/83, 161, 162, 166; 525/439, 444, 469; 528/193, 204

[56] References Cited

U.S. PATENT DOCUMENTS

| | | | |
|---|---|---|---|
| 4,093,590 | 6/1978 | Mark | 524/163 |
| 4,113,695 | 9/1978 | Mark | 524/163 |
| 4,115,354 | 9/1978 | Mark et al. | 524/163 |
| 4,430,485 | 2/1984 | Mark | 529/193 |
| 4,469,833 | 9/1984 | Mark | 524/162 |

*Primary Examiner*—John Kight
*Assistant Examiner*—Kriellion Morgan
*Attorney, Agent, or Firm*—Myron B. Kapustij; Martin B. Barancik

[57] ABSTRACT

A flame retardant non-opaque polycarbonate composition consisting essentially of, in admixture:
(i) at least one halogen-free and sulfur containing aromatic polycarbonate resin derived from
  (a) at least one halogen-free and sulfur-free non-polycyclic dihydric phenol,
  (b) from about 4 to about 25 mole percent of at least one halogen-free thiodiphenol, based on the total amount of said halogen-free and sulfur-free non-polycyclic dihydric phenol and said halogen-free thiodiphenol employed, and
  (c) a carbonate precursor; and
(ii) from about 0.001 to about 0.5 parts by weight per hundred parts by weight of said polycarbonate resin of at least one organic metal salt of sulfonic acid selected from the alkali and alkaline earth metal salts of sulfonic acids.

14 Claims, No Drawings

FLAME RETARDANT POLYCARBONATE COMPOSITIONS

This is a division of copending application Ser. No. 498,945, filed 5/27/83, now U.S. Pat. No. 4,469,833.

BACKGROUND OF THE INVENTION

The increasing concern for safety has resulted in a move towards providing safer materials for public and household use. A particular area of need is that of providing flame retardant products which are now required to meet certain flame retardant criteria by both local and federal governments as well as by manufacturers of such products. One particular set of conditions used as a standard for flame retardancy is set forth in Underwriters' Laboratories, Inc. Bulletin 94 which sets forth certain conditions by which materials are rated for self-extinguishing or flame retardant characteristics.

It is known that various halogen-containing and sulfur-containing flame retardant additives can be employed to render plastic products self-extinguishing or flame retardant. Such flame retardant additives are typically employed in amounts sufficient to be effective for their intended purpose; generally on the order of 5–20 weight percent based upon the weight of the plastic compositions. In many instances the use of these flame retardant additives in such amounts can have a degrading effect upon the plastic compositions to be rendered flame retardant, often resulting in the deterioration of valuable physical properties of the base polymers. This is particularly so when known flame retardant additives are employed with polycarbonate resins since many of these additives have a deleterious effect upon the carbonate polymer, typically resulting in discoloration, loss of impact strength, and loss of clarity and/or transparency.

It is known that polycarbonates based on halogen-containing diphenols and thiodiphenols, and blends of halogen-free polycarbonates based on diphenols and thiodiphenols with halogen containing diphenols are flame retardant, as disclosed in U.S. Pat. Nos. 4,043,980 and 4,174,359. However, the side effects of the halogen-containing polycarbonates such as the high processing temperatures necessary to obtain molded products, and the adverse effects on impact strength, particularly thick section impact strength, seriously limit the applications of such halogen containing polycarbonate compositions.

It is also known to provide flame retardant polycarbonate compositions by admixing with the polycarbonate resin certain organic alkali and alkaline earth metal salts of sulfonic acids. Such flame retardant compositions are disclosed in U.S. Pat. Nos. 3,909,490; 3,917,559; 3,919,167; 3,926,908; 3,933,734; 3,940,366, 3,951,910; 3,953,396; 3,953,399 and 3,978,024. While these compositions have proved to be quite effective and useful in most applications they suffer from the disadvantage that in some instances, particularly if some of these salts are used in relatively large concentrations, e.g., approaching the 5–10% levels, which range is within the 0.01–10% range disclosed by the aforementioned patents, they tend to adversely impact upon the optical transparency of the polycarbonate compositions.

It is also known, as disclosed in copending application Ser. No. 347,484, filed on Feb. 10, 1982, now Pat. No. 4,430,845, that polycarbonate compositions can be rendered flame retardant by either admixing with the carbonate polymer a polymer based on a thiodiphenol, or incorporating into the polycarbonate backbone a thiodephenol residue. While these compositions are also quite effective and useful in most applications, they suffer from the disadvantage that relatively quite large amounts of thiodiphenol, typically from about 23–98 mole percent, must be employed to render said compositions flame retardant. Since thiodiphenol is relatively expensive, as compared with dihydric phenols such as bisphenol-A, its use, particularly at the upper concentration ranges, places these flame retardant polycarbonate compositions at an economic disadvantage. Secondly, in some applications, particularly those where the polycarbonate resin is required to exhibit properties of sulfur-free bisphenols such as bisphenol-A, such large concentrations of thiiodiphenol are undesirable.

It would thus be very advantageous if a flame retardant polycarbonate composition could be provided which exhibited substantially most of the advantageous properties of sulfur-free and halogen-free polycarbonates, such as for example, good impact strength, particularly good thick section impact strength, optical transparency, and good processability, while at the same time being economically competitive. It is, therefore, an object of the instant invention to provide such a flame retardant polycarbonate composition.

It has been discovered that employing minor amounts of the organic alkali or alkaline earth metal salts of sulfonic acids with a polycarbonate resin derived from a dihydric phenol and minor amounts of a thiodiphenol results in a flame retardant polycarbonate composition which exhibits, to a substantial degree, substantially most of the advantageous properties of unmodified polycarbonate resins, such as for example, good impact strength, particularly good thick section impact strength, ease of processability, and optical transparency, while simultaneously being economically competitive with unmodified dihydric phenol based polycarbonate compositions.

SUMMARY OF THE INVENTION

Improved flame retardant polycarbonate compositions exhibiting optical transparency and good impact strength, particularly good thick section impact strength, comprised of, in admixture: (i) at least one halogen-free carbonate polymer derived from (a) at least one non-polycyclic, halogen-free and sulfur-free dihydric phenol; (b) a minor amount of at least one halogen-free thiodiphenol; and (ii) a minor amount of at least one organic metal salt of sulfonic acid selected from the organic alkali and alkaline earth metal salts of sulfonic acids.

DESCRIPTION OF THE INVENTION

It has now been discovered that the flammability of polycarbonate resin compositions containing a halogen-free polycarbonate can be dramatically improved without deleteriously affecting, to a substantial degree, any of the other advantageous physical and mechanical properties of the polycarbonate resin such as, for example, the impact strength, particularly the thick section impact strength, the processability, and the optical transparency. This can be accomplished by (i) incorporating into the polycarbonate resin compositions, either chemically into the backbone of said halogen-free polycarbonate resin, or physically as a separate polymer into the composition, a minor amount of at least one halogen-free thiodiphenol; and (ii) physically admixing with said halogen-free polycarbonate resin a minor amount of at least one organic metal salt of sulfonic acid selected from the organic alkali and alkaline earth metal salts of sulfonic acids.

This dramatic improvement in flame retardancy of these polycarbonate compositions is believed to be due to the synergism between the sulfur present in the form of the thiodiphenol residue and the alkali and alkaline earth metal salts of sulfonic acids.

Furthermore, not only do the instant compositions exhibit improved flame retardancy, but they also exhibit good impact strength and retain substantially most of the other valuable properties of unmodified polycarbonate resins such as optical clarity, toughness flexibility, and high heat distortion temperatures.

In one embodiment of this invention the thiodiphenol residue is chemically combined with the halogen-free carbonate resin present in the instant compositions. In this embodiment the polycarbonate compositions contain, in admixture: (i) at least one halogen-free and sulfur containing polycarbonate resin comprised of the co-reaction products of (a) at least one non-polycyclic, halogen-free and sulfur-free dihydric phenol (b) at least one halogen-free thiodiphenol, and (c) a carbonate precursor; and (ii) a minor amount of at least one organic metal salt of sulfonic acid selected from alkali and alkaline earth metal salts of organic sulfonic acids.

The non-polycyclic halogen-free and sulfur-free dihydric phenols useful in the instant invention are represented by the general formula

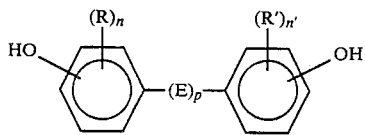

wherein:

R is independently selected from monovalent hydrocarbon radicals;

R' is independently selected from monovalent hydrocarbon radicals;

E is selected from non-cyclic divalent hydrocarbon radicals, mono-cyclic divalent hydrocarbon radicals, the —O— radicals, and the

radical;

n and n' are independently selected from whole numbers having a value of from 0 to 4 inclusive; and p is either one or zero.

The monovalent hydrocarbon radicals represented by R and R' are selected from alkyl, aryl, aralkyl, and alkaryl radicals. Preferred alkyl radicals represented by R and R' are those containing from 1 to 12 carbon atoms. Some illustrative non-limiting examples of these alkyl radicals include methyl, ethyl, propyl, isopropyl, butyl, tertiary butyl, pentyl, neopentyl, etc.

The aryl radicals are those containing one aromatic ring, i.e., the phenyl radical.

Preferred aralkyl and alkaryl radicals represented by R and R' are those containing one aromatic ring and from 7 to 11 carbon atoms, e.g., benzyl, ethylphenyl, propylphenyl, and the like.

The non-cyclic divalent hydrocarbon radicals represented by E are selected from alkylene and alkylidene radicals.

The preferred alkylene and alkylidene radicals represented by E are those containing from 1 to about 12 carbon atoms. Some illustrative non-limiting examples of these alkylene and alkylidene radicals include methylene, ethylene, propylene, 1,2-propylene, propylidene, isopropylidene, butylene, 2-methyl-1,3-propylene, butylidene, isobutylidene, and the like.

The monocylic divalent hydrocarbon radicals represented by E are selected from cycloalkylene and cycloalkylidene radicals. Preferred cycloalkylene and cycloalkylidene radicals are those containing from 4 to about 16 carbon atoms in the cyclic structure. These preferred cycloalkylene and cycloalkylidene radicals may be represented by the general formula

       II.

wherein:

$R^1$ is independently selected from lower alkyl radicals, preferably those containing from 1 to about 5 carbon atoms;

Z is a cycloalkylene or cycloalkylidene containing from 4 to 16 carbon atoms in the monocyclic structure; and d is a whole number having a value of from 0 up to and including the number of replaceable hydrogen atoms present on Z, preferably d has a value of from 0 to 6 inclusive.

Some illustrative, non-limiting examples of these preferred cycloalkylene and cycloalkylidene radicals include, cyclopentylene, cyclopentylidene, cyclohexylene, cyclohexylidene, methylcyclohexylene, ethylcyclohexylidene, and the like.

In the dihydric phenol compound represented by Formula I, when more than one R substituent is present they may be the same or different. The same is true for the R' substituent. Where p is zero in Formula I the aromatic rings are directly joined with no intervening alkylene or other bridge. The positions of the hydroxyl groups and R or R' on the aromatic nuclear residues can be varied in the ortho, meta, or para positions and the groupings can be in a vicinal, asymmetrical or symmetrical relationship, where two or more ring carbon atoms of the aromatic hydrocarbon residues are substituted with R or R' and hydroxyl group.

Preferred R and R' substituents are the alkyl radicals, with the lower alkyl radicals containing from 1 to about 5 carbon atoms being preferred.

Some illustrative non-limiting examples of the dihydric phenols of Formula V include:

2,2-bis(4-hydroxyphenyl)propane (bisphenol-A);
2,4'-dihydroxydiphenylmethane;
bis(2-hydroxyphenyl)methane;
bis(4-hydroxyphenyl)methane;
1,1-bis(4-hydroxyphenyl)ethane;
1,2-bis(4-hydroxyphenyl)ethane;
1,1-bis(2,5-dimethyl-4hydroxyphenyl)ethane;
1,3-bis(3methyl-4hydroxyphenyl)propane;
2,2-bis(3-isopropyl-5-ethyl-4-hydroxyphenyl)propane;
2,2-bis(3-isopropyl-4-hydroxyphenyl)propane;
2,2-bis(3,5-dimethyl-4-hydroxyphenyl)propane;

2,2-bis(3-methyl-5-ethyl-4-hydroxyphenyl)propane;
3,3',5,5'-tetramethyl-4,4'-dihydroxybiphenyl
1,4-bis(3,5-dimethyl-4-hydroxyphenyl)cyclohexane;
1,4-bis(4-hydroxyphenyl)cyclohexane;
1,1-bis(4-hydroxyphenyl)cyclohexane;
4,4'-dihydroxy-2,6-dimethyldiphenyl ether;
4,4'-dihydroxy-3,3'-diisopropyldiphenyl ether; and the like.

The halogen-free thiodiphenols useful in the practice of the instant invention are represented by the general formula

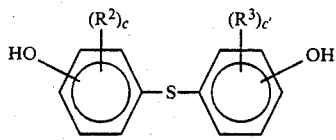

wherein:

$R^2$ is independently selected from monovalent hydrocarbon radicals;

$R^3$ is independently selected from monovalent hydrocarbon radicals; and c and c' are independently selected from whole numbers having a value of from 0 to 4 inclusive.

The monovalent hydrocarbon radicals represented by $R^2$ and $R^3$ are selected from alkyl, aryl, alkaryl, and aralkyl radicals.

Preferred alkyl radicals are those containing from 1 to about 6 carbon atoms.

The preferred aryl radical is the phenyl radical.

Preferred aralkyl and alkaryl radicals are those containing from 7 to about 11 carbon atoms.

Preferred monovalent hydrocarbon radicals represented by $R^2$ and $R^3$ are the alkyl radicals, with alkyl radicals containing from 1 to about 5 carbon atoms being the preferred alkyl radicals.

In the thiodiphenol compounds of Formula III when more than one $R^2$ substituent is present they may be the same or different. The same is true for the $R^3$ substituent. The positions of $R^2$ or $R^3$ and the hydroxyl groups on the aromatic nuclear residues can be varied in the ortho, meta, or para positions and the groupings can be in a vicinal, asymmetrical or symmetrical relationship, where two or more ring carbon atoms of the aromatic hydrocarbon residues are substituted with $R^2$ or $R^3$ and hydroxyl group.

Some illustrative non-limiting examples of the halogen-free thiodiphenol of Formula III include:
2-methyl-4,4'-thiodiphenol;
2,2'-dimethyl-4,4'-thiodiphenol;
2,2-di-tertiarybutyl-4,4'-thiodiphenol;
2,2',3,3',5,5',6,6'-octamethyl-4,4'-thiodiphenol;
3,3'-dimethyl-4,4'-thiodiphenol;
3-methyl-3'-ethyl-4,4'-thiodiphenol;
3,3'-dimethyl-4,4'-thiodiphenol;
2,2',3,3',5,5'-hexaethyl-4,4'-thiodiphenol;
2-methyl-3-propyl-4,4'-thiodiphenol;
3,5-dimethyl-4,4'-thiodiphenol;
3,5-dimethyl-3'-propyl-4,4'-thiodiphenol;
3,3',5,5'-tetramethyl-4,4'-thiodiphenol;
2,2',3,3',5,5'-hexabutyl-4,4'-thiodiphenol;
2,3,5,6'-tetrapropyl-4,4'-thiodiphenol; and the like.

These thiodiphenols are utilized in minor amounts. By minor amounts is meant that the predominate residue present in the polycarbonate resin is the dihydric phenol residue.

Quite useful thiodiphenols of Formula III are the 4,4'-thiodiphenols.

Particularly useful halogen-free thiodiphenols of Formula III are the 3,3',5,5'-tetraalkyl-4,4'-thiodiphenols such as, for example:
3,3',5,5'-tetramethyl-4,4'-thiodiphenol;
3,3',5,5'-tetraethyl-4,4'-thiodiphenol;
3,3'-dimethyl-5,5'-diethyl-4,4'-thiodiphenol;
3,5-diethyl-3',5'-dipropyl-4,4'-thiodiphenol; and the like.

It is of course possible to employ mixtures of two or more different dihydric phenols of Formula I or two or more different thiodiphenols of Formula III; or a dihydric phenol and/or a thiodiphenol with a glycol, or with a hydroxy or acid terminated polyester, or with a dibasic acid in the event a carbonate copolymer, terpolymer, interpolymer, or a copolyester-carbonate polymer is desired for use in the preparation of the aromatic carbonate polymer compositions of the instant invention.

The halogen-free and sulfur-containing non-polycyclic carbonate resins useful in the instant invention are prepared by coreacting, as essential ingredients, (i) at least one dihydric phenol of Formula I; (ii) at least one thiodiphenol of Formula III; and (iii) a carbonate precursor.

The carbonate precursor may be a carbonyl halide, a carbonate ester, or a haloformate. The carbonyl halides which may be employed are carbonyl bromide, carbonyl chloride and mixtures thereof. Typical of the carbonate esters which can be employed are diphenyl carbonate; di-(alkylphenyl)carbonates such as di(tolyl) carbonate etc.: di-(naphthyl)carbonate; phenyl tolyl carbonate, etc., or mixtures thereof. The haloformates which can be used include bis-haloformates of the dihydric phenols employed, including both the sulfur-free and sulfur-containing (thiodiphenols) diphenols employed, such as BPA-bis(chloroformate) and thiodiphenol bis(chloroformate) and their congeners. While other carbonate precursors will occur to those skilled in the art, carbonyl chloride, also known as phosgene, is preferred.

One method which may be utilized in preparing the polycarbonates of the instant invention involves the heterogeneous interfacial polymerization system utilizing an aqueous caustic solution, an organic water immiscible solvent, at least one dihydric phenol of Formula I, at least one thiodiphenol of Formula III, a catalyst, a carbonate precursor, and a molecular weight regulator. A preferred heterogeneous interfacial polymerization system is one which uses phosgene as a carbonate precursor.

Another useful method for preparing the carbonate polymers of the instant invention involves the use of an organic solvent system wherein the organic solvent system may also function as the acid acceptor, at least one dihydric phenol of Formula I, at least one thiodiphenol of Formula III, a molecular weight regulator, and a carbonate precursor. A preferred method is one wherein phosgene is employed as the carbonate precursor.

Generally, in both of the aforediscussed methods phosgene is passed into the reaction mixture containing at least one dihydric phenol of Formula I and at least one thiodiphenol of Formula III. The temperature at which the phosgenation reaction proceeds may vary from below 0° C. to above 100° C. The reaction proceeds satisfactorily at temperatures from room temperature (25° C.) to about 50° C. Since the reaction is exothermic, the rate of phosgene addition may be used to control the reaction temperature.

The acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be a hydroxide, a carbonate, a bicarbonate, or a phosphate of an alkali or alkaline earth metal.

The catalysts which can be employed are any of the catalysts that aid the polymerization of the diphenol such as bisphenol-A-with phosgene. Suitable catalysts include, but are not limited to, tertiary amines such as, for example, triethylamine, tripropylamine, N,N-dimethylaniline, quaternary ammonium compounds such as, for example, tetraethylammonium bromide, cetyl triethylammonium bromide, tetra-n-heptylammonium iodide, and the like.

The molecular weight regulators employed may be any of the known compounds which regulate the molecular weight of the carbonate polymers by a chain stopping or terminating mechanism. These compounds include, but are not limited to, phenol, tertiarybutyl phenol, and the like.

Also included herein are branched polycarbonates wherein a minor amount of a polyfunctional aromatic compound is coreacted with the dihydric phenol, the thiodiphenol and the carbonate precursor to provide a thermoplastic randomly branched polycarbonate.

The polyfunctional aromatic compounds contain at least three functional groups which are hydroxyl, carboxyl, carboxylic, anhydride, haloformyl and mixtures thereof. Examples of the polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives. These and other useful polyfunctional compounds are disclosed in U.S. Pat. Nos. 3,635,895; 4,001,184 and 4,204,047, all of which are hereby incorporated herein by reference.

Also include herein are blends of a linear polycarbonate and a branched polycarbonate.

Rather than containing a carbonate resin which is comprised of the coreaction products of (i) at least one dihydric phenol of Formula I, (ii) at least one thiodiphenol of Formula III, and (iii) a carbonate precursor, the instant polycarbonate compositions may contain blends of various halogen-free and sulfur-free polycarbonates and halogen-free sulfur-containing polycarbonates. Thus the instant compositions may contain blends of (i) at least one halogen-free and sulfur-free carbonate polymer comprised of the coreaction products of (a) at least one dihydric phenol of Formula I, and (b) a carbonate precursor; and (ii) at least one halogen-free sulfur-containing carbonate polymer comprised of the coreaction products of (a) at least one thiodiphenol of Formula III, and (b) a carbonate precursor.

The instant compositions may also contain blends of (i) at least one halogen-free sulfur-containing carbonate polymer comprised of the coreaction products of (a) at least one dihdyric phenol of Formula I, (b) at least one thiodiphenol of Formula III, and (c) a carbonate precursor; and (ii) at least one halogen-free and sulfur-free carbonate polymer comprised of the coreaction products of (a) at least one dihydric phenol of Formula I, and (b) a carbonate precursor.

The high molecular weight non-polycylic, halogen-free aromatic carbonate polymers of the instant invention generally have a weight average molecular weight in the range of from about 5,000 to about 200,000, preferably in the range of from about 10,000 to about 100,000, and more preferably in the range of from about 25,000 to about 50,000.

The carbonate polymers of the instant invention which are comprised of the coreaction products of (i) at least one dihydric phenol of Formula I, (ii) at least one thiodiphenol of Formula III, and (iii) a carbonate precursor contain at least two of the following repeating structural units:

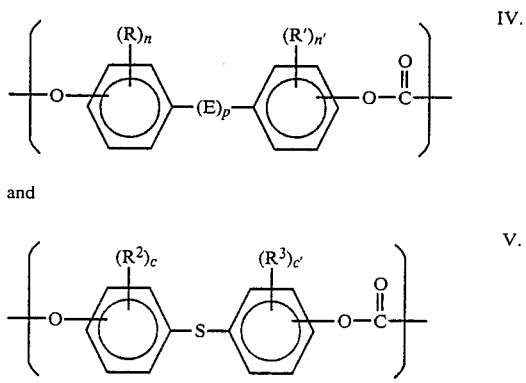

and wherein R, R', R², R³, E, n, n', p, c and c' are as defined hereinafore.

When, as described hereinafore, the dihydric phenol of Formula I and/or the thidodiphenol of Formula III are coreacted with a dibasic acid a copolyestercarbonate is formed. Briefly stated, the copolyestercarbonates of this invention comprise recurring carbonate groups, carboxylate groups, and aromatic carbocyclic groups in the linear polymer chain, in which at least some of the carboxylate groups and at least some of the carbonate groups are bonded directly to ring carbon atoms of the aromatic carbocyclic groups.

These copolyester-carbonate polymers contain ester and carbonate bonds in the polymer chain, wherein the amount of ester bonds is in the range of from about 25 to about 90 mole percent, preferably in the range of from about 35 to about 80 mole percent. For example, 5 moles of bisphenol-A reacting completely with 4 moles of isophthaloyl dichloride and 1 mole of phosgene would give a copolyester-carbonate of 80 mole percent ester bonds.

The copolyester-carbonates of the instant invention are prepared by coreacting (i) a carbonate precursor, (ii) at least one halogen-free and sulfur-free non-polycyclic dihydric phenol of Formula I, (iii) a minor amount of at least one halogen-free thiodiphenol of Formula III, and (iv) at least one difunctional carboxylic acid or a reactive derivative thereof.

In general, any difunctional carboxylic acid conventionally used in the preparation of linear polyesters may be utilized in the preparation of the instant copolyester-carbonates. Generally, the acids which may be used include the aliphatic carboxylic acids, the aromatic carboxylic acid, and the aliphatic-aromatic carboxylic acids. These acids are disclosed in U.S. Pat. No. 3,169,121, which is hereby incorporated by reference.

The difunctional carboxylic acids which may be used generally conform to the general formula $$R^4-R^5)_q COOH \quad \text{VI.}$$

wherein $R^5$ is an alkylene, alkylidene or cycloaliphatic groups such as a cycloalkylene or cycloalkylidene group; an alkylene, alkylidene or cycloaliphatic group containing ethylenic unsaturation; and aromatic group such as phenylene, substituted phenylene, and the like; two or more aromatic groups connected through non-aromatic linkages such as alkylene or alkylidene groups; and a divalent aralkyl radical such as tolylene, xylelene, and the like. $R^4$ is either a carboxyl or a hydroxyl group. The letter q represents one where $R^4$ is a hydroxyl group and either one or zero where $R^4$ is a carboxyl group.

Preferred difunctional carboxylic acids are the aromatic difunctional carboxylic acids, i.e., those acids of Formula VI wherein $R^5$ represents an aromatic radical and q is one. The preferred aromatic difunctional carboxylic acids are represented by the general formula

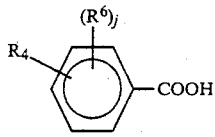
VII.

wherein $R^4$ is as defined above, $R^6$ is independently selected from alkyl radicals, preferably those alkyl radicals containing from 1 to about 12 carbon atoms; and j is a whole number having a value of from 0 to 4 inclusive.

Mixtures of these carboxylic acids may be employed, and where the term difunctional carboxylic acid is used herein it is to be understood that this term includes mixtures of two or more different difunctional carboxylic acids as well as individual difunctional carboxylic acids.

Particularly useful aromatic carboxylic acids are isophthalic acid, terephthalic acid, and mixtures thereof. A particularly useful aromatic carboxylic acid comprises a mixture of isophthalic acid and terephthalic acid wherein the weight ratio of isophthalic acid to terephthalic acid is in the range of from about 1:10 to 10:0.

Rather than utilizing the difunctional carboxcylic acids per se, it is possible and sometimes even preferred to employ the reactive derivatives of said acids. Illustrtaive of these reactive derivatives are the acid dihalides, such as the diacid halides. The preferred diacid halides are the diacid chlorides. Thus, for example, instead of employing isophthalic acid or terephthalic acid, terephthaloyl dichloride or isophthaloyl dichloride may be employed.

The copolyester-carbonates of the present invention may be prepared by known processes such as interfacial polymerization or phase boundary separation, transesterification, solution polymerization, melt polymerization, interesterification, and the like. Various prior art polymerization processes are disclosed in U.S. Pat. Nos. 3,030,311; 3,169,121; 3,207,184 and 4,188,314, all of which are hereby incorporated herein by reference. Although the processes may vary, several of the preferred processes typically include dissolving or dispersing the reactants in a suitable water immiscible solvent medium and contacting the reactants with a carbonate precursor, such as phosgene, in the presence of a suitable catalyst and an aqueous caustic solution under controlled pH conditions. A molecular weight regulator, that is a chain stopper, is generally added to the reactants prior to or during contacting them with the carbonate precursor.

Also included herein are branched copolyester-carbonates wherein a polyfunctional compound of the type described hereinafore is a coreactant with the dihydric phenol of Formula I and the thiodiphenol of Formula III in the reaction mixture, containing also the carbonate precursor and the ester precursor, i.e., the difunctional carboxylic acid or a reactive derivative thereof, to provide a thermoplastic randomly branched copolyester-carbonate resin.

The proportion of carboxylate and carbonate groups present in the final polymer can be suitably varied by varying the molar ratio of the dihydric phenol and thiodiphenol to difunctional carboxylic acid. Where a dicarboxylic acid is used, it is preferable that this molar ratio of phenol to acid be more than one. Because of the presence of hydroxyl group in the hydroxy carboxylic acids, this preferred molar ratio does not apply in the case of hydroxy carboxylic acid copolymers and virtually any ratio of phenol to hydroxy carboxylic acid may be conventionally used.

The copolyester-carbonates of the instant invention will generally contain the following repeating structural units (when a dicarboxylic acid is used):
units of Formula IV;
units of Formula V;

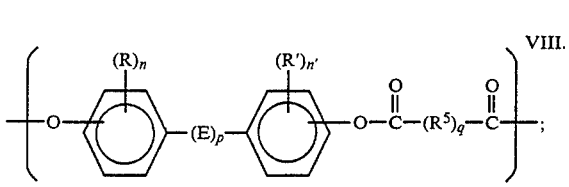

and

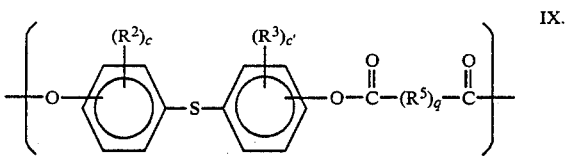

wherein R, R', $R^2$, $R^3$, $R^5$, E, n, n', p, q, c and c' are as defined hereinafore.

Rather than utilizing a single copolyester-carbonate resin blends of copolyester-carbonate resins may be employed in formulating the instant compositions. Thus, for example, the instant compositions may contain a blend of copolyester-carbonate resins comprised of (i) at least one halogen-free and sulfur-free copolyester-carbonate resin comprised of the coreaction products of (a) at least one dihydric phenol of Formula I, (b) at least one difunctional carboxylic acid or a reactive derivative thereof, and (iii) a carbonate precursor; and (ii) at least one halogen-free sulfur-containing copolyester-carbonate resin comprised of the coreaction products of (a) at least one thiodiphenol of Formula III, (b) at least one difunctional carboxylic acid or a reactive derivative thereof, and (c) a carbonate precursor.

Another copolyester-carbonate resin blend is one containing (i) at least one halogen-free and sulfur-free copolyester-carbonate resin comprised of the coreaction products of (a) at least one dihydric phenol of Formula I, (b) at least one difunctional carboxylic acid or a reactive derivative thereof, and (c) a carbonate precursor; and (ii) at least one halogen-free and sulfur-containing copolyester-carbonate resin comprised of the coreaction products of (a) at least one dihydric phenol of Formula I, (b) at least one thiodiphenol of Formula III, (c) at least one difunctional carboxylic acid or a reactive derivative thereof; and (c) a carbonate precursor.

The organic alkali metal salts and organic alkaline earth metal salts of sulfonic acids useful in the instant compositions are selected from the group consisting of:
(A) alkali and alkaline earth metal salts of substituted and unsubstituted sulfonic acids of aromatic sulfides;
(B) alkali and alkaline earth metal salts of halocycloaliphatic aromatic sulfonic acids;
(C) alkali and alkaline earth metal salts of sulfonic acids of heterocyclic compounds;
(D) alkali and alkaline earth metal salts of substituted and unsubstituted sulfonic acids of aromatic ketones;
(E) alkali and alkaline earth metal salts of monomeric or polymeric aromatic sulfonic acids;
(F) alkali and alkaline earth metal salts of monomeric or polymeric substituted aromatic sulfonic acids:
(G) alkali and alkaline earth metal salts of monomeric or polymeric aromatic amide sulfonic acids;
(H) alkali and alkaline earth metal salts of sulfonic acids of aromatic ethers;
(I) alkali and alkaline earth metal salts of monomeric or polymeric sulfonic acids of aromatic carboxylic acids; and
(J) alkali and alkaline earth metal salts of monomeric or polymeric phenol esters of sulfonic acids.

The alkali and alkaline earth metal salts of substituted and unsubstituted sulfonic acids of aromatic sulfides (A) are disclosed in U.S. Pat. No. 3,909,490, which is hereby incorporated herein by reference. These salts, as disclosed in said patent, can best be represented by the formula $$R'(S)_{1-2}R''(SO_3M)_{1-6}(X)_{0-11}$$

wherein:
X is an electron withdrawing radical;
M is a metal which may be selected from the periodic table of either an alkali metal or an alkaline earth metal; and
R' and R'' may be either an aryl radical of 1-2 aromatic rings or an aliphatic radical of 1-6 carbon atoms and they may be the same or different, with the proviso that R' and R'' together must contain at least one aromatic ring. The preferred compound represented by this formula is disclosed as being sodium 4,4'-dichlorodiphenylsulfide-3-sulfonate.

The alkali and alkaline earth metal salts of halocycloaliphatic aromatic sulfonic acids (B) are disclosed in U.S. Pat. No. 3,917,559, which is hereby incorporated herein by reference.

These salts, as disclosed in said patent, are substituted aromatic sulfonic acids wherein the substituent consists of a thermally stable, halogenated cycloaliphatic radical. These salts can best be represented by the formula $$R'_m(SO_3M)_yR''_z$$

wherein:
R' is a halogenated cycloaliphatic radical;
R$\Delta$ is an aryl radical of 1-4 aromatic rings;
M is a metal which may be selected from the periodic table of either an alkali metal or an alkaline earth metal;
m is an integer of 1-2;
y is an integer of 1-6; and
z is an integer of 1-2.

The preferred compound represented by this formula is disclosed as being sodium 4'[1,4,5,6,7,7-hexachlorobicyclo-[2.2.1]-hept-5-en-endo-2-yl]benzenesulfonate.

The alkali and alkaline earth metal salts of sulfonic acids of heterocyclic compounds (C) are disclosed in U.S. Pat. No. 3,919,167, which is hereby incorporated herein by reference.

These salts can best be represented by the general formula $$X_{0-15}R(SO_3M)_{1-6}$$

wherein:
X is an electron withdrawing radical;
M is a metal which may be selected from the periodic table of either an alkali metal or an alkaline earth metal; and
R is an organic nucleus selected from the group of organic heterocyclic nuclei consisting of

 (i)

wherein Z is selected from the hetero atoms consisting of sulfur, oxygen and nitrogen,

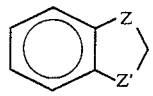 (ii)

wherein Z and Z' are independently selected from the group consisting of carbon and the hetero atoms nitrogen, sulfur, and oxygen, providing that at least one of Z or Z' ia a hetero atom,

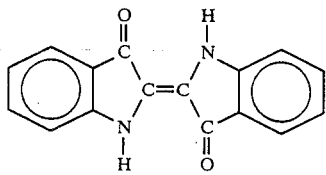 (iii)

phthalocyanine, (iv)

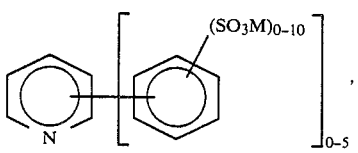 (v)

and

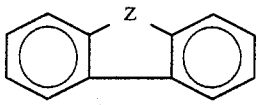
(vi)

wherein Z is selected from the hetero atoms consisting of nitrogen, oxygen and sulfur.

The preferred compound represented by this formula is disclosed as being the sodium salt of 2,5-dichlorothiophene-3-sulfonic acid.

The alkali and alkaline earth metal salts of sulfonic acids of aromatic ketones (D) are disclosed in U.S. Pat. No. 3,926,908, which is hereby incorporated herein by reference.

These salts, as disclosed in said patent, have the following formula:

$$R'(CO)_{1-2}R''(SO_3M)_{1-8}(X)_{0-11}$$

wherein:

X is an electron withdrawing radical;

M is a metal which may be selected from the periodic table of either an alkali metal or an alkaline earth metal; and R' and R" are independently selected from aryl radicals of 1-2 aromatic rings and aliphatic radicals of 1-6 carbon atoms, provided, however, that R' and R" must contain at least one aromatic radical.

The preferred compound represented by this formula is disclosed as being 4,4'-dichlorobenzophenone-3,3'-disulfonate.

The alkali and alkaline earth metal salts of monomeric or polymeric aromatic sulfonic acids (E) are disclosed in U.S. Pat. No. 3,933,734, which is hereby incorporated herein by reference.

The alkali and alkaline earth metal salts of the monomeric sulfonates, as disclosed in said patent, can best be represented by the general formula $$[A]_{0-1}[R]_{0-2}[B]$$

wherein:

A and B can, in turn, be independently selected from the following formula $$(SO_3M)_yR'$$

where R' is an aryl radical of 1-4 aromatic rings and y is an integer of 0-10, provided that the sum of y is at least one, and M is a metal selected from the group consisting of alkali metals and alkaline earth metals; and R is an organic radical of 1-20 carbon atoms selected from alkyl, aralkyl, alkaryl, aralkenyl, alkylene, alkylidene, aralkylidene, alkenylidene and aralkenylidene radicals.

The preferred monomeric aromatic sulfonate is disclosed as being disodium naphthalene-2,6-disulfonate.

The alkali and alkaline earth metal salts of polymeric aromatc sulfonates, as disclosed in this patent, can best be represented by the formula $$[A]_m[R_1]_{m+n}[B]_n$$

wherein:

A an B are independently selected from $$(SO_3M)_yR'$$

where M is a metal selected from the alkali metals and the alkaline earth metals, y is an integer of 0-10, provided that the sum of y must equal one, and R' is an aryl radical of 1-4 aromatic rings;

$R_1$ is an organic radical of 1-20 carbon atoms selected from arylene, alkylene, aralkylene, alkenylene, aralkenylene, alkylidene, aralkylidene, alkenylidene and aralkenylidene radicals; and the sum of m and n must be at least 4 and can be as high as 4,000.

The alkali and alkaline earth metal salts of monomeric or polymeric substituted aromatic sulfonic acids (F) are disclosed in U.S. Pat. No. 3,940,366, which is hereby incorporated herein by reference.

The alkali and alkaline earth metal salts of the monomeric aromatic sulfonic acids, as disclosed in said patent, can best be represented by the general formula $$8 A]_{0-1}[R]_{0-1}[B]$$

wherein:

A and B are independently selected from the following formula $$R'_x(SO_3M)_yR''$$

where R' is an electron withdrawing radical, M is a metal which may be selected from the periodic table of either an alkali metal or an alkaline earth metal, R" is an aryl radical of 1-4 aromatic rings, x is an integer of 0-17, and y is an integer of 0-10, with the proviso that that the sum of x must equal at least one and that the sum of y must equal at least one; and R is an organic radical of 1-20 carbon atoms selected from alkyl, aralkyl, alkenyl, aralkenyl, aryl, arylene, alkylene, aralkylene, alkenylene, aralkenylene, alkylidene, aralkylidene, alkenylidene and aralkenylidene radicals.

The preferred salt of the aromatic sulfonic acids is disclosed as being the sodium salt of 2,4,5-trichlorobenzenesulfonic acid.

The alkali and alkaline earth metal salts of the polymeric substituted aromatic sulfonic acids, as disclosed in this patent, can best best be represented by the general formula $$[A]_m[R_1]_{m+n}[B]_n$$

wherein:

A anb B are independently selected form the following formula $$R'_x(SO_3M)_yR''$$

where R' is an electron withdrawing radical, M is a metal which may be selected from the periodic table of either an alkali metal or an alkaline earth metal, R" is an aryl radical of 1-4 aromatic rings, x is an integer of 0-17, and y is an integer of 0-10, with the proviso that the sum of x must equal at least one and that the sum of y must equal at least one;

$R_1$ is an organic radical of 1-20 carbon atoms and is selected from arylene, alkylene, aralkylene, alkenylene, aralkenylene, alkylidene, aralkylidene, alkenylidene, and aralkenylidene radicals; and the sum of m and n must be at least 4 and can be as high as 2,000, the selection of m and n can be random or equal or one can be zero.

The alkali and alkaline earth metal salts of monomeric or polymeric aromatic amide sulfonic acids (G) are disclosed in U.S. Pat. No. 3,951,910, which is hereby incorporated herein by reference.

The alkali and alkaline earth metal salts of monomeric aromatic amide sulfonic acids, as disclosed in said patent, can best be represented by the general formula

[R]$_z$[NBB']$_v$[NDD']$_w$[OA]$_t$[X]$_y$[Hal]$_u$[SO$_3$M]$_s$ wherein:

N is nitrogen;

O is oxygen:

R, B, B', D, D' and A are organic radicals independently selected from aliphatic and cycloaliphatic radicals of 1–20 carbon atoms and aryl radicals of 1–4 aromatic rings, provided that this formula contains at least one aromatic ring to which the [SO$_3$M] substituent is attached, B, B', D, and D' are also independently hydrogen;

X is a di- or trivalent radical selected from the following:

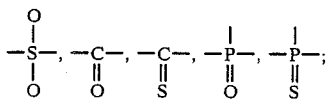

Hal is a halogen selected from fluorine, chlorine and bromine;

M is a metal which may be selected from the periodic table of either an alkali or an alkaline earth metal;

z and t are integers of 0–2, and v and w are integers from 0–4, provided that the sum of the integers z,t,v and w is at least one;

y is an integer of from 1–4;

s is an integer of from 1–8; and u is an integer of from 0–10.

The preferred salt of the monomeric aromatic amide sulfonic acids, as disclosed in this patent, is the sodium salt of 2,4,5-trichlorobenzenesulfonanilide-4'-sulfonate.

The alkali and alkaline earth metal salts of polymeric aromatic amide sulfonic acids, as disclosed in this patent, can best be represented by the general formula ([R]$_z$[NBB']$_v$[NBB']$_w$[OA]$_t$[X]$_y$[Hal]$_u$[SO$_3$M]$_s$)$_a$
([R]$_z$[NBB']$_v$[NBB']$_w$[OA]$_t$[X]$_y$[Hal]$_u$[SO$_3$M]$_s$)$_b$ wherein:

N, O, B, B', D, D', X, M, Hal, t, u, v, w, y and z have the same meaning as specified above for the monomeric aromatic amide sulfonic acids:

a and b are integers from 2 to 300; and s is an integer from 0–8, provided that the sum of s is at least one.

The alkali and alkaline earth metal salts of sulfonic acids of aromatic ethers (H) are disclosed in U.S. Pat. No. 3,953,396, which is hereby incorporated herein by reference. These salts may be the salts of either monomeric or polymeric aromatic ether sulfonic acids.

The alkali and alkaline earth metal salts of monomeric aromatic ether sulfonic acids, as disclosed in said patent, can best be represented by the general formula (R'O)$_{1-2}$R''(SO$_3$M)$_{1-6}$(X)$_{0-11}$ wherein:

X is an electron withdrawing radical;

M is a metal which may be selected from the periodic table of either an alkali metal or an alkaline earth metal; and R' and R'' are independently selected from aryl radicals of from 1–2 aromatic rings and aliphatic radicals of 1–6 carbon atoms, with the proviso that R' and R'' together must contain at least one aromatic ring.

The preferred salt of the monomeric aromatic ether sulfonic acids is disodium tetrchlorodiphenyletherdisulfonate.

The alkali and alkaline earth metal salts of polymeric ether sulfonic acids, as disclosed in this patent, can best be represented by the general formula

[A]$_x$[B]$_y$[ArO]$_n$[Hal]$_s$[SO$_3$M]$_t$H wherein:

Ar is a phenylene radical;

O is oxygen;

A is an alkyl radical of 1–4 carbon atoms;

B is a phenyl radical;

Hal is a halogen selected from fluorine, chlorine and bromine;

M is a metal which may be selected from the periodic table of either an alkali metal or an alkaline earth metal;

n is an integer of from 2 to 300;

x, y and s are integers of from 0 to 600; and t is an integer of from 1 to 600.

The preferred alt of the polymeric aromatic ether sulfonic acids is disclosed as being polysodium poly(2,6-dimethylphenyleneoxide)polysulfonate.

The alkali and alkaline earth metal salts of sulfonic acids of monomeric and polymeric aromatic carboxylic acids and esters (I) are disclosed in U.S. Pat. No. 3,953,399, which is hereby incorporated herein by reference.

The alkali and alkaline earth metal salts of the unsubstituted and substituted sulfonic acids of monomeric aromatic carboxylic acids and esters, as disclosed in said patent, have the general formula X$_p$R$_v$(SO$_3$M)$_m$(COOY)$_n$R'$_q$ wherein:

X is an electron withdrawing radical;

M is a metal selected from the alkali metals and the alkaline earth metals;

R is an aryl radical of 1–4 aromatic rings:

R' is an organic radical of 1–4 carbon atoms selected from alkyl, alkenyl, alkylene, alkenylene, alkylidene, and alkenylidene radicals;

Y is a metal selected from alkali metals and alkaline earth metals, or an organic radical of 1–20 carbon atoms selected from alkyl, cycloalkyl, aralkyl, alkenyl, cycloalkenyl, aralkenyl, and aryl radicals;

m and n are integers of from 1 to 6;

p and q are integers of from 0 to 10; and v is an integer of from 1 to 10.

The preferred monomeric salt of this type is sodium dimethyl 2,4,6-trichloro-5-sulfoisophthalate.

The polymeric form of the sulfonic acid salts of unsubstituted and substituted aromatic carboxylic acids and esters can best be represented by the general formula

[Hal]$_p$[R(COO)$_{2-4}$R']$_m$[SO$_3$M]$_x$ wherein:

Hal is a halogen radical selected from fluorine, chlorine and bromine:

R and R' are either aromatic nuclei of 1-4 aromatic rings or aliphatic and cycloaliphatic radicals of from 2-20 carbon atoms, providede that either R or R' must be aromatic;

M is a metal selected from alkali metals and alkaline earth metals;

m is an integer from 2-300;
x is an integer from 1-600; and
p is an integer from 0-600.

The preferred polymeric salts of this type are polysodium polyethyleneterephthalate polysulfonate, polysodium polybutylene-2,5-dibromoterephthalate polysulfonate, and polysodium polybutyleneterephthalate polysulfonate.

The alkali and alkaline earth metal salts of monomeric or polymeric phenol esters of sulfonic acids (J) are disclosed in U.S. Pat. No. 3,978,024, which is hereby incorporated herein by reference.

The alkali and alkaline earth metal salts of monomeric phenol ester sulfonic acids, as disclosed in said patent, can best be represenetd by the general formula

[R]$_z$([O$_q$A]$_u$[X]$_y$[O$_r$B]$_v$)$_m$ wherein:

A and B are independently selected from the following formula

R'(SO$_3$M)$_n$R''$_p$ where R' is an aromatic radical of 1-4 aromatic nuclei, M is selected from alkali and alkaline earth metals, R'' is an electron withdrawing group, n is an integer of 0 to 4, and p is an integer of 0 to 10, provided, however, that the sum of n must be at least one;

R is an organic radical of 1-20 carbon atoms and is selected from alkyl, aralkyl, alkenyl, aralkenyl, aryl, arylene, alkylene, aralkylene, alkenylene, aralkenylene, alkylidene, aralkylidene, alkenylidene, aralkenylidene, A, and B radicals;

X is selected from

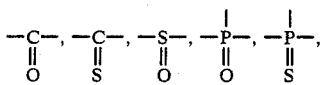

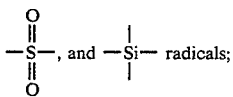, and —Si— radicals;

z is an integer of from 0-3;
y is an integer of from 1-2;
m is an integer of from 1-4;
q and r are integers of from 1-4;
v is an integer of from 0-4; and
O is oxygen.

The preferred metal salt of monomeric phenol ester sulfonic acid is the sodium salt of the sulfonic acid of dichlorophenyl 2,4,5-trichlorobenzenesulfonate.

The alkali and alkaline earth metal salts of polymeric phenol ester sulfonic acids, as disclosed in this patent, can best be represented by the general formula ([R]$_z$([A][X]$_y$[B]$_{1-3}$))$_a$([R]$_z$([A][X]$_y$[B]$_{1-3}$))$_b$ wherein:

A and B are independently selected from the following formula (O)$_q$R'(SO$_3$M)$_n$R''$_p$ where O, R', M, R'', n, p and q have the same meaning as cited previously;

R has the same meaning as cited previously;
X has the same meaning as cited previously;
z and y have the same meaning as cited previously;
a is an integer of from 0-2,000 and b is an integer of from 0-2,000, provided, however, that the sum of a and b must be at least 4 and can be as high as 2,000.

As disclosed hereinbefore, the instant polycarbonate compositions contain, in admixture:

(i) at least one halogen-free and sulfur-containing carbonate resin, or a blend of at least one halogen-free and sulfur-free carbonate resin and at least one halogen-free and sulfur-containing carbonate resin; and (ii) a minor amount of at least one organic metal salt of sulfonic acid selected from the alkali and alkaline earth metal salts of sulfonic acids.

For the sake of clarity and convenience the term carbonate resin as used hereinafter is meant to include the carbonate polymers and the copolyester-carbonate polymers described hereinafore.

The halogen-free sulfur-containing carbonate resins of the instant invention, as well as the blends of halogen-free and sulfur-free carbonate resins and the halogen-free and sulfur-containing carbonate resins, contain an amount of sulfur which, when said carbonate resins are admixed with the metal salts of sulfonic acids, is effective to render said compositions flame retardant. The sulfur is chemically present in the halogen-free and sulfur-containing carbonate resins in the form of the residues of the thiodiphenols of Formula III. Generally, the amount of sulfur present is in the range of from about 1 to about 3.3 weight percent based on the amount of the halogen-free and sulfur-containing carbonate resin present, or based on the amount of the blend of halogen-free and sulfur-free carbonate resins and halogen-free and sulfur-containing carbonate resins present.

This amount of sulfur is equivalent to a thiodiphenol residue content in the polycarbonate resin, relative to the dihydric phenol residue content, of from about 4 to about 25 mole %.

The amount of the organic metal salts of sulfonic acids present in the instant compositions is an amount which when combined with the amount of sulfur present in the form of the thiodiphenol residue is effective to render the instant compositions flame retardant, but is insufficient to render said compositions opaque, i.e., an amount which is insufficient to significantly deleteriously affect the non-opaque character of the instant polycarbonate compositions. Generally, this amount is in the range of from about 0.001 to about 0.5 part by weight per hundred parts by weight (pph) of the halogen-free polycarbonate resin present.

This combination of the alkali and alkaline earth metal salts of sulfonic acids and the thiodiphenol has a synergistic effect upon the flame retardancy of the instant compositions. That is to say, the same or greater degree of flame retardancy can be obtained by using much smaller concentrations of these two components in combination than by utilizing much larger amounts of these components separately or individually.

Thus, for example., the prior art generally discloses that compositions comprised of an admixture of a polycarbonate resin and an organic metal salt of sulfonic acid typically require from about 0.01 to about 10 parts of the salt per hundred parts of the resin in order to be flame retardant. The instant compositions thus contain one-tenth the amount of salt required by the prior art.

Likewise, workers in the field have generally found that the amount of sulfur required to render polycarbonate compositions flame retardant is in the range of from about 3 to about 15 weight percent. The instant compositions thus generally contain about one-half the amount of thiodiphenol disclosed as being required by workers in the field.

The instant compositions exhibit several important advantageous over prior art flame retardant polycarbonate compositions which contain much larger amounts of either the metal salts or the thiodiphenols. Since the instant compositions contain much smaller amounts of the metal salts of sulfonic acids their physical properties are not deleteriously affected to the same degree as those of prior art polycarbonate compositions. Thus, for example, the instant compositions exhibit good impact strength, good clarity, and good color stability.

Furthermore, since the instant compositions contain a much smaller amount of thiodiphenol, which is relatively expensive, they are much cheaper than prior art polycarbonate compositions containing larger amounts of thiodiphenol.

Thus, the instant compositions are cheaper and posses better physical properties than prior art flame retardant polycarbonate compositions while exhibiting an equal or superior degree of flame retardancy.

The instant compositions may also optionally contain certain commonly known and used additives such as, for example, antioxidants; antistatic agents, inert fillers such as glass fibers, glass beads, talc, mica, clay, and the like; mold release agents; ultraviolet radiation absorbers such as the benzophenones, benzotriazoles, benzylidene malonates, and the like; hydrolytic stabilizers such as the epoxides disclosed in U.S. Pat. Nos. 3,489,716; 4,138,379 and 3,839,247, all of which are hereby incorporated herein by reference; color stabilizers such as the organophosphites disclosed in U.S. Pat. Nos. 3,305,520 and 4,118,370, both of which are hereby incorporated by reference; and the like.

PREFERRED EMBODIMENT OF THE INVENTION

The following examples are presented to more fully and clearly illustrate the invention. Although the examples set forth the best mode presently known to practice the invention they are intended to be and should be considered as illustrative rather than limiting the invention. In the examples, all parts and percentages are by weight unless otherwise specified.

The following examples illustrate polycarbonate compositions falling outside the scope of the instant invention and are presented for comparative purposes only.

EXAMPLE 1

This example illustrates a prior art copolycarbonate which is derived from bisphenol-A and thiodiphenol. This polycarbonate composition contains no organic alkali or alkaline earth metal salts of sulfonic acids.

Into a mixture of 2283 grams of bisphenol-A (10 moles), 218 grams (1 mole) of 4,4′-thiodiphenol, 5700 grams of water, 9275 grams of methylene chloride, 32 grams of phenol and 10 grams of triethylamine are introduced, at ambient temperature, 1180 grams of phosgene over a period of 97 minutes while maintaining the pH of the two-phase system at about 11; i.e., pH 10–12.5, by simultaneously adding a 25% aqueous sodium hydroxide solution. At the end of the addition period, the pH of the aqueous phase is 11.7 and the bisphenol-A content of this phase is less than 1 part per million as determined by ultraviolet analysis.

The methylene chloride phase is separated from the aqueous phase, washed with an excess of dilute (0.01N) aqueous HCl and then washed three times with deionized water. The polymer is precipitatde by steam and dried at 95° C. The resultant polycarbonate is fed to an extruder, which extruder is operated at about 500° C., and the extrudate is comminuted into pellets.

The pellets are then injection molded at about 600° C. into test bars of about 5 in. by ½ in. by about 1/16 and ⅛ in. thick and into test squares of about 2 in. by 2 in. by about ⅛ in. thick. The ⅛ in. thick test bars are subjected to the test procedure set forth in Underwriters' Laboratories, Inc. Bulletin UL-94, Burning Test for Classified Materials. In accordance with this test procedure, materials that pass the test are rated V-O, V-I or V-II based on the results of 5 specimens. The criteria for each V (for vertical) rating per UL-94 is briefly as follows:

"V-O":
  Average flaming and/or glowing after removal of the igniting flame shall not exceed 5 seconds and none of the specimens shall drip flaming particles which ignite absorbent cotton.

"V-I":
  Average flaming and/or glowing after removal of the igniting flame shall not exceed 25 seconds and the glowing does not travel vertically for more than ⅛″ of the specimen after flaming ceases and glowing is incapable of igniting absorbent cotton.

"V-II":
  Average flaming and/or glowing after removal of the igniting flame shall not exceed 25 and the specimens drip flaming particles which ignite absorbent cotton.

In addition, a test bar which continues to burn for more than 25 seconds after removal of the igniting flame is classified, not by UL-94, but by standards of the invention, as "burns". Further, UL-94 requires that all test bars in each test group must meet the V-type rating to achieve the particular classification. Otherwise, the 5 test bars receive the rating of the worst single bar. For example, if one bar is classified as V-II and the other four are classified as V-0, then the rating for all 5 bars is V-II.

The results of these tests are set forth in Table I.

EXAMPLE 2

This example illustrates a prior art polycarbonate composition in that the composition contains an organic alkali or alkaline earth metal salt of sulfonic acid but the polycarbonate resin does not contain any thiodiphenol residues.

Ninety-nine parts by weight of an aromatic polycarbonate prepared by reacting bisphenol-A and phosgene in the presence of an acid acceptor and a molecular weight regulator and having an intrinsic viscosity of 0.57 is mixed with one part of sodium 2,4,5-trichlorobenzenesulfonate by tumbling the ingredients together in a laboratory tumbler. The resulting mixture is then fed to an extruder, which extruder is operated at about 265° C., and the extrudate is comminuted into pellets.

The pellets are then injection molded at about 315° C. into test bars of about 5 in. by ½ in. by 1/16 in. and by about ⅛ in thick. The test bars are then subjected to the UL-94 test procedure and the results are set forth in Table I.

EXAMPLE 3

The procedure of Example 2 is substantially repeated except that 99.99 parts of the aromatic polycarbonate are mixed with 0.01 part of the sodium 2,4,5-trichlorobenzenesulfonate. The test bars are prepared in accordance with the procedure of Example 2 and are subjected to the UL-94 test procedure. The results are set forth in Table I.

EXAMPLE 4

The procedure of Example 2 is substantially repeated except that sodium 2,5-dichlorothiophene-3-sulfonate is substituted for the sodium 2,4,5-trichlorobenzenesulfonate.

EXAMPLE 5

The procedure of Example 3 is substantially repeated except that sodium 2,5-dichlorothiophene-3-sulfonate is substituted for the sodium 2,4,5-trichlorobenzenesulfonate.

The following examples illustrate the preparation of the flame retardant compositions of the instant invention.

EXAMPLE 6

The procedure of Example 1 was substantially repeated, except that the copolycarbonate obtained in Example 1 is fed to the extruder in admixture with 0.1 part per hundred parts by weight of sodium 2,4,5-trichlorobenzenesulfonate.

EXAMPLES 7–10

The procedure of Example 6 is substantially repeated except that various additives and various amounts of said additives, as set forth in Table I, are substituted for the 0.1 pph of sodium 2,4,5-trichlorobenzenesulfonate; and the amounts of the thiodiphenol residue present in the copolycarbonate resin are varied, also as set forth in Table I.

EXAMPLE 11

The procedure of Example 1 is substantially repeated, except that the bisphenol-A is replaced with 2684 grams of 4,4'-cyclohexylidene diphenol and the extrusion is carried out in admixture with 0.2 parts per hundred parts of resin of sodium 2,5-dichlorobenzenesulfonate. The UL-94 rating is found to be V-0.

EXAMPLE 12

The procedure of Example 1 is substantially repeated, except that 228 grams of the bisphenol-A are replaced with 284.4 grams of 4,4'-isopropylidene-3,3',5,5'-tetramethyldiphenol and the extrusion is carried out in admixture with 0.3 pph of sodium 2,4,5-trichlorobenzenesulfonate. The UL-94 rating is found to be V-0.

TABLE I

| Example No. | BPA g. | TDP g | Mol. ratio BPA:TDP | Salt Additive | pph | UL-94 rating |
|---|---|---|---|---|---|---|
| 1 | 2283 | 218 | 10:1 | None | 0 | V-II |
| 2 | — | None | — | Sodium 2,4,5,-trichlorobenzenesulfonate | 1 | V-O |
| 3 | — | None | — | Sodium 2,4,5-trichlorobenzenesulfonate | 0.01 | V-II |
| 4 | — | None | — | Sodium 2,5-dichlorothiophene-3-sulfonate | 1 | V-O |
| 5 | — | None | — | Sodium 2,5-dichlorothiophene-3-sulfonate | 0.01 | V-II |
| 6 | 2283 | 108 | 20:1 | Sodium 2,4,5-trichlorobenzenesulfonate | 0.1 | V-O |
| 7 | 2283 | 108 | 20:1 | Sodium 2,5-dichlorothiophene-3-sulfonate | 0.05 | V-O |
| 8 | 2283 | 218 | 10:1 | Sodium 2,5-dichlorobenzene sulfonate | 0.1 | V-O |
| 9 | 2283 | 218 | 10:1 | Potassium diphenylsulfone-3-sulfonate | 0.05 | V-I |
| 10 | 2283 | 436 | 5:1 | Sodium p-bromobenzenesulfonate | 0.02 | V-O |

As illustrated by the data in Table I the compositions of the instant invention, Examples 6–10, exhibit a greater degree of flame retardancy than the prior art compositions, Examples 1–5. Comparing Examples 6 and 7 with Example 1 it is clear that the compositions of the instant invention exhibit a greater degree of flame retardancy than the composition of Example 1, even though the compositions of Examples 6 and 7 are comprised of a polycarbonate resin which contains only ½ of the thiodiphenol residues contained by the polycarbonate resin of Example 1.

Examples 2–5 illustrate that mixing organic alkali and alkaline earth metal salts of sulfonic acids with a halogen-free and sulfur-free polycarbonate resin results in a flame retardant composition. However, as illustrated by a comparison of Examples 2 and 4 with Examples 3 and 5, these salts must be present in relatively high concentrations in order to render these compositions V-0. At lower concentrations of these salts, the resultant compositions are rendered V-II. Examples 6-10 illustrate that the instant compositions can be rendered V-0 or V-I by inclusion therein of about one tenth of the amount of said salts which brought about the prior art compositions flame retardance of V-0.

This clearly illustrates the dramatic increase in flame retardancy of the instant compositions. This improvement in flame retardancy is achieved by utilizing much smaller concentrations of both the thiodiphenol and the organic alkali and alkaline earth metal salts of sulfonic acids than employed by the prior art. Thus, when the thiodiphenol and the organic alkali and alkaline earth metal salts of sulfonic acids are employed in combination, much lower concentrations of these materials need be used than if they were used separately to provide improved flame retardancy.

It will thus be seen that the objects set forth above, among those made apparent from the preceding description, are efficiently attained, and since certain changes may be made in carrying out the above processes and in the compositions set forth without departing from the scope of this invention, it is intended that all matters contained in the above description shall be interperted as illustrative and not in a limiting sense.

The use of the term nonpolycyclic refers to the group, if present, which joins together the two phenolic rings. That group should be nonpolycylic, that is, not having two rings with at least a common carbon atom, such as naphthalene. The definition also excludes bridgehead compounds such as norbornyl, bicyclo(2.2.2) octane, adamantane and the like, which are considered to be polycyclic for the purposes of this invention.

What is claimed is:

1. A flame retardant non-opaque polycarbonate composition consisting essentially of, in admixture:
   (i) at least one halogen-free and sulfur containing aromatic polycarbonate resin derived from
      (a) at least one halogen-free and sulfur-free non-polycyclic dihydric phenol,
      (b) from about 4 to about 25 mole percent of at least one halogen-free thiodiphenol, based on the total amount of said halogen-free and sulfur-free non-polycyclic dihydric phenol and said halogen-free thiodiphenol employed, and
      (c) a carbonate precursor; and
   (ii) from about 0.001 to about 0.5 parts by weight per hundred parts by weight of said polycarbonate resin of at least one organic metal salt of sulfonic acid selected from the alkali and alkaline earth metal salts of sulfonic acids.

2. The composition of claim 1 wherein said alkali and alkaline earth metal salt of sulfonic acid is selected from:
   alkali and alkaline earth metal salts of substituted and unsubstituted sulfonic acids of aromatic sulfides;
   alkali and alkaline earth metal salts of halocycloaliphatic aromatic sulfonic acids;
   alkali and alkaline earth metal salts of sulfonic acid of heterocyclic compounds;
   alkali and alkaline earth metal salts of substituted and unsubstituted sulfonic acids of aromatic ketones;
   alkali and alkaline earth metal salts of monomeric and polymeric aromatic sulfonic acids;
   alkali and alkaline earth metal salts of monomeric and polymeric substituted aromatic sulfonic acids;
   alkali and alkaline earth metal salts of monomeric and polymeric aromatic amide sulfonic acids;
   alkali and alkaline earth metal salts of sulfonic acids of aromatic ethers;
   alkali and alkaline earth metal salts of monomeric and polymeric sulfonic acids of aromatic carboxylic acids;
   alkali and alkaline earth metal salts of monomeric and polymeric phenol esters of sulfonic acids; and
   alkali and alkaline earth metal salts of perfluoroalkyl sulfonic acids.

3. The composition of claim 1 wherein said halogen-free and sulfur-free non-polycyclic dihydric phenol is represented by the general formula:

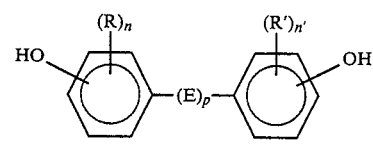

wherein:
   R is independently selected from monovalent hydrocarbon radicals selected from alkyl radicals, aryl radicals, aralkyl radicals, and alkaryl radicals;
   R' is independently selected from monovalent hydrocarbon radicals selected from alkyl radicals, aryl radicals, aralkyl radicals, and alkaryl radicals;
   E is selected from non-cyclic divalent hydrocarbon radicals selected from alkylene radicals and alkylidene radicals, monocyclic divalent hydrocarbon radicals selected from cycloalkylene radicals and cycloalkylidene radicals, the —O— radical, and the

radical;
   n and n' are independently selected from whole numbers having a value of from 0 to 5 inclusive; and
   p is either zero or one.

4. The composition of claim 3 wherein said monovalent hydrocarbon radicals are selected from alkyl radicals.

5. The composition of claim 3 wherein said non-cyclic divalent hydrocarbon radicals are selected from alkylene and alkylidene radicals.

6. The composition of claim 7 wherein E is selected from alkylene, alkylidene, cycloalkylene, and cycloalkylidene radicals.

7. The composition of claim 6 wherein said monovalent hydrocarbon radicals are selected from alkyl radicals.

8. The composition of claim 7 wherein p is one.

9. The composition of claim 8 wherein said dihydric phenol is bisphenol-A.

10. The composition of claim 1 wherein said halogen-free thiodiphenol is represented by the general formula

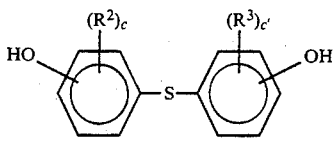

wherein:
R² is independently selected from monovalent hydrocarbon radicals selected from alkyl radicals, aryl radicals, aralkyl radicals, and alkaryl radicals;
R³ is independently selected from monovalent hydrocarbon radicals selected from alkyl radicals, aryl radicals, aralkyl radicals, and alkaryl radicals; and
c and c′ are independently selected from whole numbers having a value of from 0 to 4 inclusive.

11. The composition of claim 10 wherein said monovalent hydrocarbon radicals are selected from alkyl radicals.

12. The composition of claim 11 wherein said thiodiphenol is selected from 3,3′5,5′-tetraalkyl-4,4′-thiodiphenols.

13. The composition of claim 10 wherein said thiodiphenol is 4,4′-thiodiphenol.

14. A flame-retardant non-opaque polycarbonate composition consisting essentially of, in admixture:
(i) at least one halogen-free and sulfree-free aromatic polycarbonate resin derived from
   (a) at least one halogen-free and sulfur-free non-polycyclic dihydric phenol, and
   (b) a carbonate precursor;
(ii) at least one halogen-free and sulfur-containing aromatic polycarbonate resin derived from
   (a) at least one halogen-free and sulfur-free non-polycyclic dihydric phenol,
   (b) from about 4 to about 25 mole percent of at least one halogen-free thiodiphenol, based on the total amount of said halogen-free and sulfur-free non-polycyclic dihydric phenol and said halogen-free thiodiphenol employed, and
   (c) a carbonate precursor; and
(iii) from about 0.001 to about 0.5 parts by weight per hundred parts by weight of polycarbonate resin of at least one organic metal salt of sulfonic acid selected from the alkali and alkaline earth metal salts of sulfonic acids.

* * * * *